April 2, 1929.  P. JORDAN  1,707,808
INSULATED WIRE FOR ELECTRIC INSTALLATION
Filed July 2, 1927
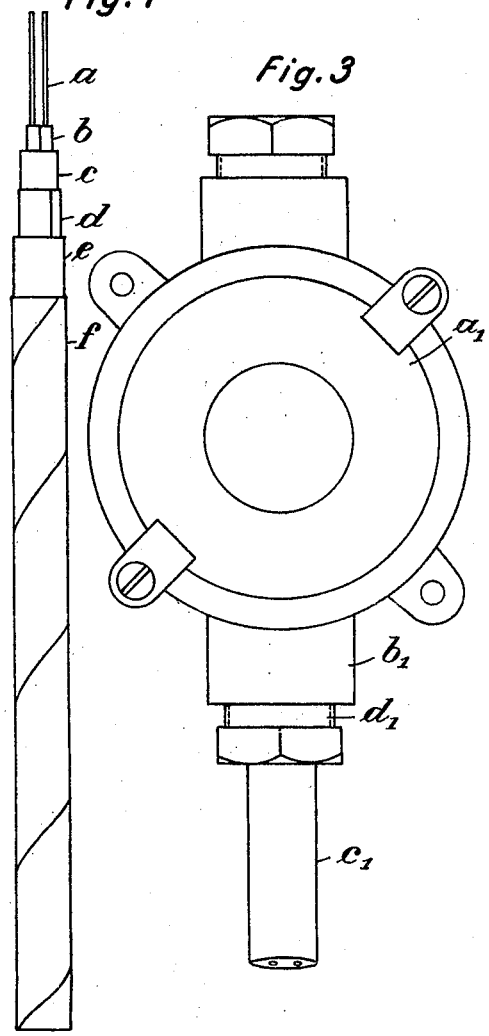
Inventor:
P. Jordan
By his Attorney Patented Apr. 2, 1929.

1,707,808

UNITED STATES PATENT OFFICE.

PAUL JORDAN, OF BERLIN-STEGLITZ, GERMANY.

INSULATED WIRE FOR ELECTRIC INSTALLATION.

Application filed July 2, 1927, Serial No. 203,194, and in Germany February 6, 1926.

Electric conductors enclosed in a metal sheath, as frequently used for internal or house wiring, have already been provided with an outer covering of fibre material for the purpose of protecting the metal covering against chemical attack, dampness, corrosive fumes and the like. The coverings referred to are, however, in an imperfect manner only adapted for the purpose mentioned, unless made impervious to liquids and gases. This is not possible with fibre coverings, impregnated or not, as gases and fumes easily pass through, reaching the metal covering which they corrode. The only protection which can here be afforded is to give the metal covering an external one of rubber. The latter, however, is in turn exposed to damages by the atmosphere—light and air—and especially to physical injury. And these circumstances are of importance, because electric metal sheathed conductors, as contemplated in the invention, are in the main not laid in an absolutely safe bed as is the case with cables, but must be fastened by clamps and clasps, at the walls, so that they may be injured by these clamps and struck and damaged by accident. When the rubber covering has once become brittle or is injured, however, dampness and fumes quickly penetrate to the metal covering and attack it.

This drawback is eliminated by the present invention, in which the metal covering of the said conductor is provided with two protective layers, the first of which is a rubber covering affording the metal fullest protection against gases and fumes and atmospheric influences, and the second a fibre covering for the rubber sheath which is thus shielded from injury due to mechanical forces and atmospheric influences. The fibre covering is preferably made of impregnated weatherproof cotton tape.

An electric conductor constructed in this manner has a greater yieldingness and flexibility than other similar conductors, the rubber sheath between the metal tube and the impregnated fibre covering preventing the latter, which generally becomes hard and stiff after a longer engagement, from being pulled and torn when it is bent and curved. This flexibility is of great advantage in electric wiring.

The invention is shown in the new form of construction in the accompanying drawing.

Fig. 1 is a side view, and Fig. 2 a view on the end surface of the new conductor.

$a$ is the metal conductor,
$b$ are insulation sheaths,
$c$ a bituminous layer,
$d$ the metal sheath,
$e$ the rubber covering or tube,
$f$ the fibre covering, for instance an impregnated cotton-tape.

Wires with insulation tube of this kind can be used everywhere to great advantage, particularly in stables, in the open air, and so on.

The metal sheath $d$ may, as in many cases usual in electric cables, be made by winding a metal band, or two bands, over the bituminous layer $c$. The layer $c$ completely surrounds all the electric conductors $a$ provided within the metal tube or covering $d$ and insulates the conductors from the tube.

The metal sheathed conductors, as will be seen from the above, are provided with a rubber covering over the metal covering, and accordingly can yield on their outer circumference. When inserted in branch boxes, cable troughs and so on, they are completely shut off in an entirely reliable manner from all dampness by the use of ordinary stuffing boxes. This has the disadvantage however, that the rubber tube and the thin fibre covering are easily exposed to damage due to mechanical forces. For this reason it is advisable to provide the stuffing boxes with a rubber packing, but not for the purpose of keeping out the dampness, as is usually the case with these rubber packings, but for the purpose of avoiding injuries due to mechanical causes. Viewed separately the use of stuffing boxes with rubber packing for introducing electric wires into branch boxes and cable troughs is not new. Their purpose, however, has hitherto only been to keep out moisture.

A connection of the wires in this manner with a branch box is shown in Figs. 3 and 4 in view as well as in section.

The box $a_1$ which may be of any desired model, is provided with two inlets $b_1$ through which the weatherproofing rubber insulated wires $c_1$ are to be introduced. According to the invention the packing is effected by means of a rubber packing box $d_1$ in the inlets.

What I claim is:—

1. A flexible electric conductor comprising an electric wire, an insulating layer of bituminous material completely surrounding said wire, a metal sheath closely and completely surrounding said insulating layer, a rubber tube in close contact with and covering said metal sheath, and a protective outer fibre covering on the rubber tube.

2. A flexible electric conductor comprising a pair of electric wires, each provided with an individual insulating sheath, an insulating layer of bituminous material completely surrounding said pair of wires embedded in said material, a metal sheath closely and completely surrounding said insulating layer, a rubber tube in close contact with and covering said metal sheath and a protective outer fibre covering on the rubber tube.

3. A flexible electric conductor comprising an electric wire, an insulating layer of bituminous material completely surrounding said wire, a metallic band wound on said bituminous layer to form a metal sheath preventing leakage of said bituminous material, a rubber tube in close contact with and covering said metal sheath, and a protective outer fibre covering on the rubber tube.

In testimony whereof I have affixed my signature.

PAUL JORDAN.